United States Patent [19]

Parrish et al.

[11] Patent Number: 5,730,797
[45] Date of Patent: Mar. 24, 1998

US005730797A

[54] MORTAR COMPOSITION

[75] Inventors: John Anthony Parrish, Romford; Robert John Smith, Brentwood; Thomas Frederick Smith, Romford, all of United Kingdom

[73] Assignee: Stonelight Systems Ltd., Navestock, England

[21] Appl. No.: 700,531

[22] PCT Filed: Feb. 27, 1995

[86] PCT No.: PCT/GB95/00407

§ 371 Date: Aug. 28, 1996

§ 102(e) Date: Aug. 28, 1996

[87] PCT Pub. No.: WO95/23121

PCT Pub. Date: Aug. 31, 1995

[30] Foreign Application Priority Data

Feb. 28, 1994 [GB] United Kingdom ............... 9403811

[51] Int. Cl.$^6$ ................................................. C04B 14/20
[52] U.S. Cl. ................. 106/716; 106/738; 106/814; 106/817; 106/38.27; 106/38.9
[58] Field of Search ................. 106/716, 738, 106/814, 817, 819, 38.22, 38.27, 38.9

[56] References Cited

U.S. PATENT DOCUMENTS

| 766,938 | 8/1904 | Diefendorf | 106/738 |
| 1,317,525 | 9/1919 | Romano | 106/716 |
| 2,032,071 | 2/1936 | Scholz | 106/716 |

FOREIGN PATENT DOCUMENTS

102157  10/1937  Australia ............... 106/738

OTHER PUBLICATIONS

CA 86:110477, Ohta, "Cement mortar for decorative use", corresponds to JP 51,145,525., Dec. 1976

*Primary Examiner*—Michael Marcheschi
*Attorney, Agent, or Firm*—Watov & Kipnes, P.C.

[57] ABSTRACT

A mortar composition for molding, casting or rendering purposes includes: (a) mixture comprising 1.5 to 8 parts by volume of powdered stone and one part by volume of powdered mica based on the total parts by volume of the composition; and (b) a binder therefore. The binder is preferably a hydraulic cement such as Portland cement. An artificial stone may be produced by coating a substrate, such as concrete, with the mortar composition.

11 Claims, No Drawings

MORTAR COMPOSITION

This application is a 371 of International application No. PCT/GB95/00407, filed Feb. 27, 1995.

1. Field of the Invention

This invention relates to a mortar composition for use in producing a simulated stone material. The composition can be used for moulding or casting, and as an external plaster.

2. Background to the Invention

Conventional cement mortars and concrete mixes containing sand and other relatively coarse aggregates have two principal disadvantages. Firstly, the surface finish is rough and it is difficult to achieve fine moulding in the surface. Secondly, as the surface weathers and the cement binder is eroded, the aggregate particles become raised relative to the remainder of the surface, leading to further toughening of the surface and an unsatisfactory appearance.

A finer surface finish can be achieved by the use of gypsum plasters, but these are unsuitable for exterior use as they are readily and rapidly eroded by rainwater. Replacing coarse aggregates in cement-based mixes with finer materials gives rise to shrinkage as the mixes harden, which in turn leads to cracking. In addition, such materials generally have a low mechanical strength.

GB-A-1 447 591 discloses an insulating material containing expanded mica with masonry cement, high alumina cement and sodium disilicate. The mixture contains a high proportion, by volume, of mica, approximately twice the volume of the masonry cement, and is intended for insulation purposes, rather than as a surface finish itself.

GB-A-1 091 766 discloses a brick formed of a hardened mixture of a granular aggregate and a bonding material which can contain silica flour and a small proportion of finely ground mica to improve the appearance, imparting lustre and sparkle to the brick.

GB-A-874 280 discloses a finishing plaster based on gypsum and hydrated lime, and with finely ground chalk, limestone or dolomite, together with aggregates, which may include perlite or vermiculite and which are intended to alter the texture or density of the final plaster. The aggregates are usually coarser that the finely ground materials, or of fibrous character.

SUMMARY OF THE INVENTION

The invention provides a mortar composition comprising:
(a) a mixture containing a major proportion, by volume, of powdered stone and a minor proportion of particulate mica, and a binder therefor.

Preferably, the mixture contains 1 part by volume of mica to 1.5 to 8 parts, more preferably 2 to 6 parts, still more preferably 2.5 to 4 parts, of powdered stone. The stone is suitably sand grade or finer, preferably in the form of a dust or flour grade in order to give a very smooth finish when hardened. 100 μm grains or smaller may, for example, be used. The mica is suitably a 20–100 mesh powder, preferably formed from expanded mica. A 60 mesh powder is particularly useful.

The mortar composition suitably contains up to 70% by weight of powdered stone.

The binder is preferably a hydraulic cement, and the composition preferably contains approximately one part by volume of a hydraulic cement powder to 1 to 5 parts, preferably at least 2.5 parts, of the mixture. More preferably, the composition contains up to 2 parts, suitably about 1 part, by volume of hydraulic cement to each part of mica. The hydraulic cement powder is suitably a Portland cement and is more preferably a white Portland cement, such as that sold under the trade mark "SNOWCRETE" in the UK by Blue Circle Cement Ltd, since this permits the true colour of the stone to be seen in the hardened material.

Alternatively, other binders such as polymeric binders may be used, alone or in combination, and mixtures of polymeric materials with cementitious binders may also be used.

It is preferred that excess water is not present, and it has been found that when casting wet, the addition of 1% calcium chloride to the mortar is beneficial.

Plasticisers known for cementitious mortars may be added. The hardened composition may be treated with silicone to reduce permeability.

The mixture can be used for dry packing. When dry packing, delamination of the layers must be avoided by scuffing each layer after compaction.

The composition can be used for such applications as exterior or interior plastering, floor surfaces, casting of tiles, paving blocks or bricks, repair of stonework, forming mouldings and decorative surfaces, and for casting of headstones for graves and of wall plaques and the like. In the latter case, a mould can be employed with raised reversed lettering in its surface, the lettering being assembled from individual letters to permit its re-use. By this means, a high quality durable headstone or plaque can be formed which has the appearance and qualities of stone, but which avoids the need for skilled stone carvers or expensive stone-carving machines. Similarly, statues may be moulded from the material of the invention.

By using different types of stone-powder, such as limestone, granite, or marble, the appearance of different types of stone can be simulated. This can be very important for stone repair work. The hardened composition can be carved and machined in exactly the same way as natural stone.

The addition of fine sand in place of part or all of the fine stone is possible. The sand may be a rendering sand or finer. Indeed, any crushed or milled aggregate can be used in the composition of the invention.

The composition can be coloured by the addition of dyes or pigments, and is especially suitable for use in simulating the appearance of other materials, such as conventional bricks and terra cotta.

The composition of the invention is especially useful for the production of tiles for roofing, facing and flooring purposes. When used for roofing tiles, the composition can closely simulate the appearance of clay tiles, and will weather in a similar way in use. The advantages over clay tiles are the saving in energy, since no firing is required and consistency of shape and dimensions, while tiles made from the composition are lighter than conventional concrete tiles, but of better appearance.

The composition can also be used in the manufacture of flooring tiles which can closely resemble quarry tiles and like clay tiles, while being less expensive to produce, since no firing is required.

The composition of the mixture can be applied as a coating using a brush or trowel.

The cured composition of the invention has fire-resistant properties, while being decorative in appearance.

For moulding or casting purposes, the composition can be applied to the inside face of a mould as a relatively thin layer, the bulk of the mould then being filled with a lightweight or other filler, for example a concrete mix. The resultant casting can thus have a fine and detailed surface finish.

As a result, the composition may be used to coat lightweight building blocks and the like to give a high quality smooth interior or exterior hard finish to relatively cheap materials.

The composition can be handled and applied in the same way as interior plaster, and adheres well to any appropriately-keyed surface. When hardened, the composition is resistant to wear and to erosion by water, in the same way as natural stone. It is significantly harder than a gypsum plaster finish.

It will be understood that the precise proportions of the components in the composition will be chosen according to the use for which it is intended. For example, by varying the proportions of cement powder, harder or softer materials may be produced. It will be within the skill of those in this field to adapt the proportions according to use, within the scope of the invention.

The Examples illustrate the invention.

EXAMPLE 1

Compositions were made up from 4 parts by volume of powdered limestone to one part of mica and one part of white Portland cement, and three parts by volume of powdered limestone to one part of mica and one part of white Portland cement, with sufficient water to produce workable mortars. The compositions were each applied by trowel to brick substrates and, by using conventional plastering techniques, were finished to a flat, smooth surface. After hardening, the surfaces closely resembled smooth finished limestone. The materials did not crack or shrink noticeably during setting, and were not readily detached from the brick substrate. They were substantially less susceptible to mechanical damage than a gypsum plaster, and were unaffected by exposure to moisture or frost. The composition with three parts of stone gave a harder finish than that with four parts of stone.

EXAMPLE 2

Articles cast from compositions as in Example 1 were left exposed to the weather for over 12 months, together with a sample of natural Bath stone, by way of comparison. It was noted that the water absorption by the natural Bath stone encouraged the growth of mould and lichen. The article formed of the composition of the invention absorbed water to a much lower extent, with significantly less visible growth of mould and lichen. In addition a lightweight concrete block with a 5 mm skin of the mortar composition of the invention carved after hardening, showed no signs of deterioration after 12 months.

EXAMPLE 3

In a freeze-thaw test, hardened samples of the composition containing 3 parts by volume of powdered Portland stone to one of mica and one of white Portland cement were exposed to a 24-hour cycle of freezing and thawing over a period of 24 days. The samples consisted of solid samples of the hardened composition, together with 2 mm and 5 to 10 mm layers of the composition on lightweight concrete blocks and on solid blocks of a 3:1 sand/cement mortar. The cycle consisted of an initial soaking of the sample with water, followed by alternate 12 hour intervals in a freezer at −20° C. and thawing at room temperature. A sample of natural Bath stone was exposed to the freeze-thaw cycle alongside the sample of the invention. No deterioration of the sample according to the invention was observed at the end of the test. By contrast, the natural stone showed signs of lamination.

EXAMPLE 4

Samples of a mortar composition consisting of 3 parts by volume of powdered limestone to 1 part of powdered mica and 1 part of white Portland cement, giving a weight mix with water of cement 1.0: stone/mica 2.79: water 0.94, were subjected to tests on the use as a rendering material, as follows:

Drying Shrinkage (determined according to the method of BS 812: Part 120: 1989)—no more than 0.060%

Fresh Density—1965 kg/m$^3$

Hardened Density—2005 kg/m$^3$

Flexural Strength in N/mm$^2$ (determined according to EN196: 1987)

1 day—2.6
3 days—3.7
7 days—4.0
28 days—4.4

Compressive Strength in N/mm$^2$ (determined according to EN196: 1987)

1 day—9.5
3 days—15.7
7 days—18.4
28 days—25.7

Initial Surface Absorption of Water, in ml/m$^2$/s (determined according to the test given in BS 1881: Part 5: 1970)

10 mins—0.146
30 mins—0.100
1 hour—0.072
2 hours—0.061

Bond Strength, in N/mm$^2$ (determined by trowelling the mortar, at a thickness of approximately 5 mm, on to specimens of the two substrates. The bond strength was measured by an ELCOMETER ADHESION TESTER). An ELCOMETER Adhesion Tester is a device used to measure bond strength, and in this instance is used to subject the mortar covered substrates to a force great enough to separate the mortar from the substrate.("ELCOMETER" is a trade mark).

To Brick—2.65
To Cast Stone—1.41

The results show that the flexural strength is higher than would be expected for a mortar having the level of compressive strength measured. The mortar would thus require a higher stress to develop before it cracked. The drying shrinkage value, although satisfactory, may have been affected by the level of water content of the mixture. A lower level could improve the shrinkage value.

EXAMPLE 5

Compositions were made up as follows:

3 parts by volume of powdered stone to 1 part mica and 1.5 parts Portland cement.

3 parts by volume of powdered stone to ½ part mica and 1 part cement 2.5 parts by volume of powdered stone to 1 part mica and 1 part cement.

In each case, sufficient water was added to permit mixing, it being found desirable to use the least possible water in order to ensure that the resultant cured composition is as hard as possible. Each of these mixes was found to be satisfactory for rendering and casting purposes and to give a satisfactory appearance and strength when cured.

We claim:

1. A mortar composition consisting of;
   (a) a mixture comprising 1.5 to 8 parts by volume of powdered stone and one part by volume of powdered mica; and (b) one part of binder for every 1 to 5 parts of mixture.

2. A mortar composition according to claim 1, wherein the mica has a particle size of 20–100 mesh.

3. An artificial stone formed by coating an inner surface of a mold with a mortar composition according to claim 1, filling the mold with a concrete mix or filler, curing the concrete mix or filler, and removing the mold, whereby said concrete mix or filler is substantially coated is substantially coated by said composition.

4. A mortar composition according to claim 1, wherein the mixture comprises 2 to 6 parts by volume of powdered stone and one part by volume of mica.

5. A mortar composition according to claim 4, wherein the mixture comprises 2.5 to 4 parts by volume of powdered stone and one part by volume of mica.

6. A mortar composition according to claim 1, wherein the stone is in the form of dust or flour.

7. A mortar composition according to claim 1, wherein the binder is a hydraulic cement.

8. A mortar composition according to claim 7, wherein the hydraulic cement is a Portland cement.

9. A mortar composition according to claim 7, consisting of part by volume of cement for every 2.5 to 5 parts of the mixture.

10. A mortar composition according to claim 8, comprising up to 2 parts by volume of cement for each part of mica.

11. A mortar composition according to claim 10, comprising 1 part by volume of cement for each part of mica.

\* \* \* \* \*